L. S. HENLEY & F. R. KELLER.
SYMPATHETIC GOVERNOR FOR ELECTRIC POWER DISTRIBUTION.
APPLICATION FILED JULY 3, 1914.
1,236,931.
Patented Aug. 14, 1917.
3 SHEETS—SHEET 3.
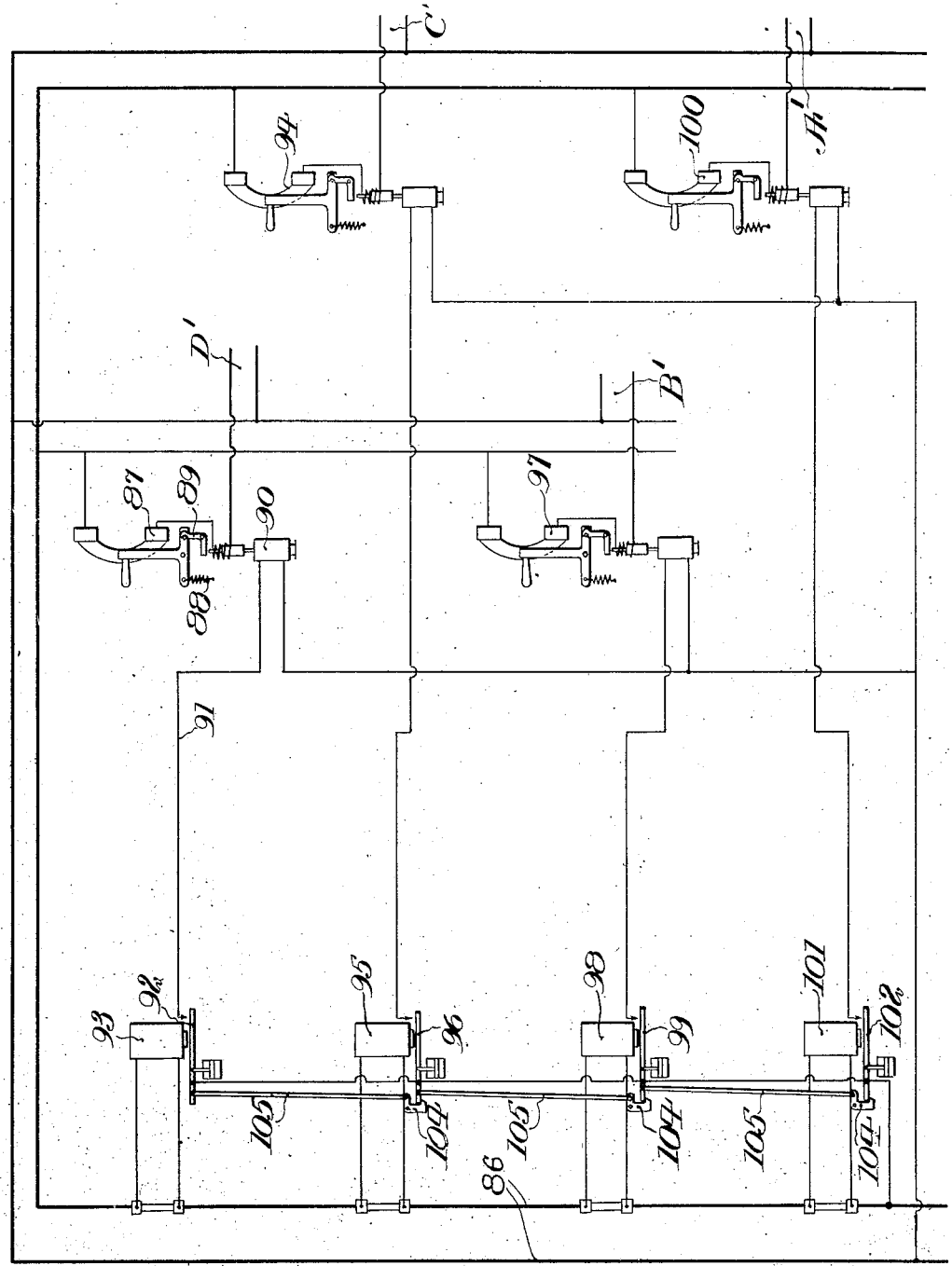

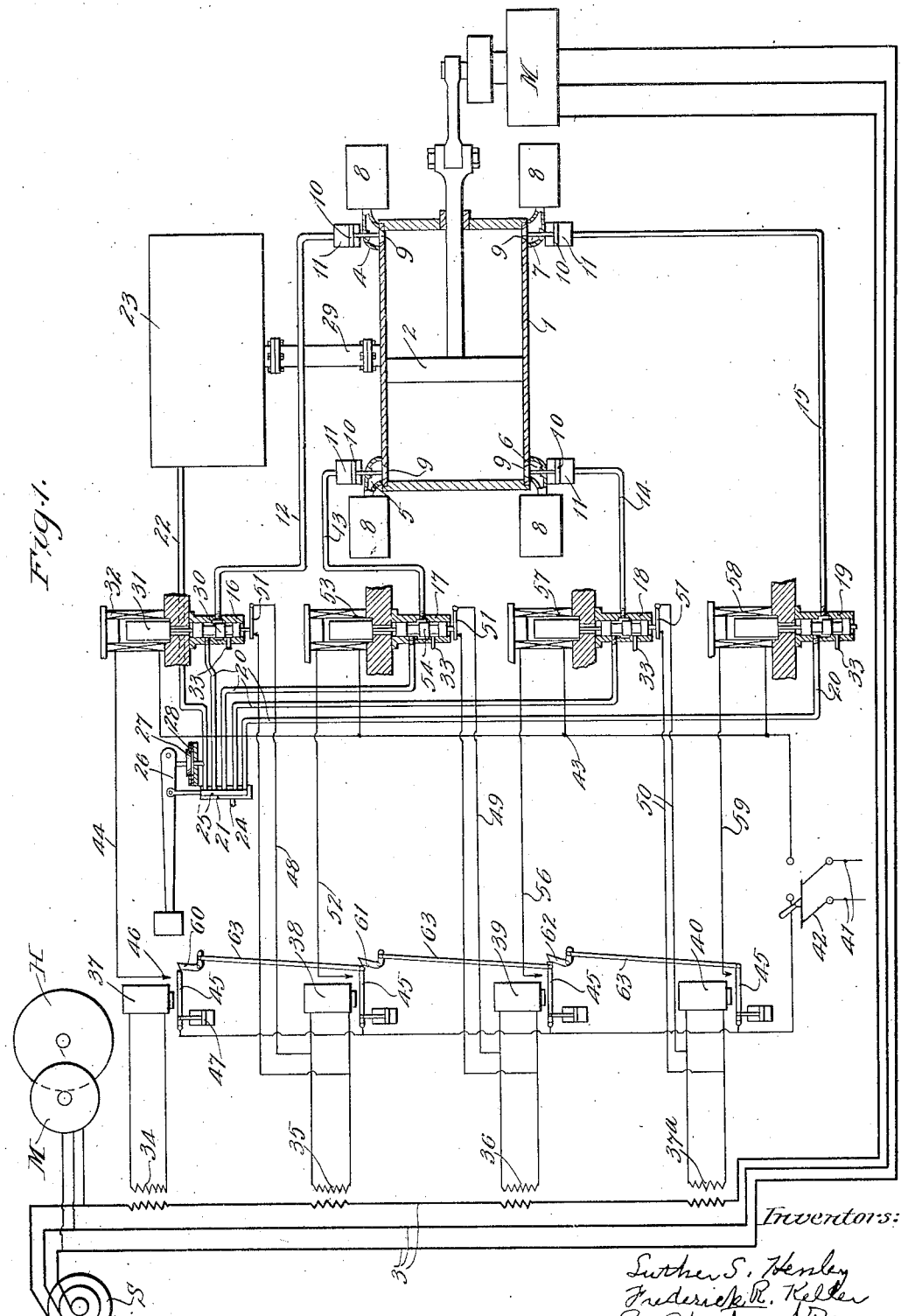

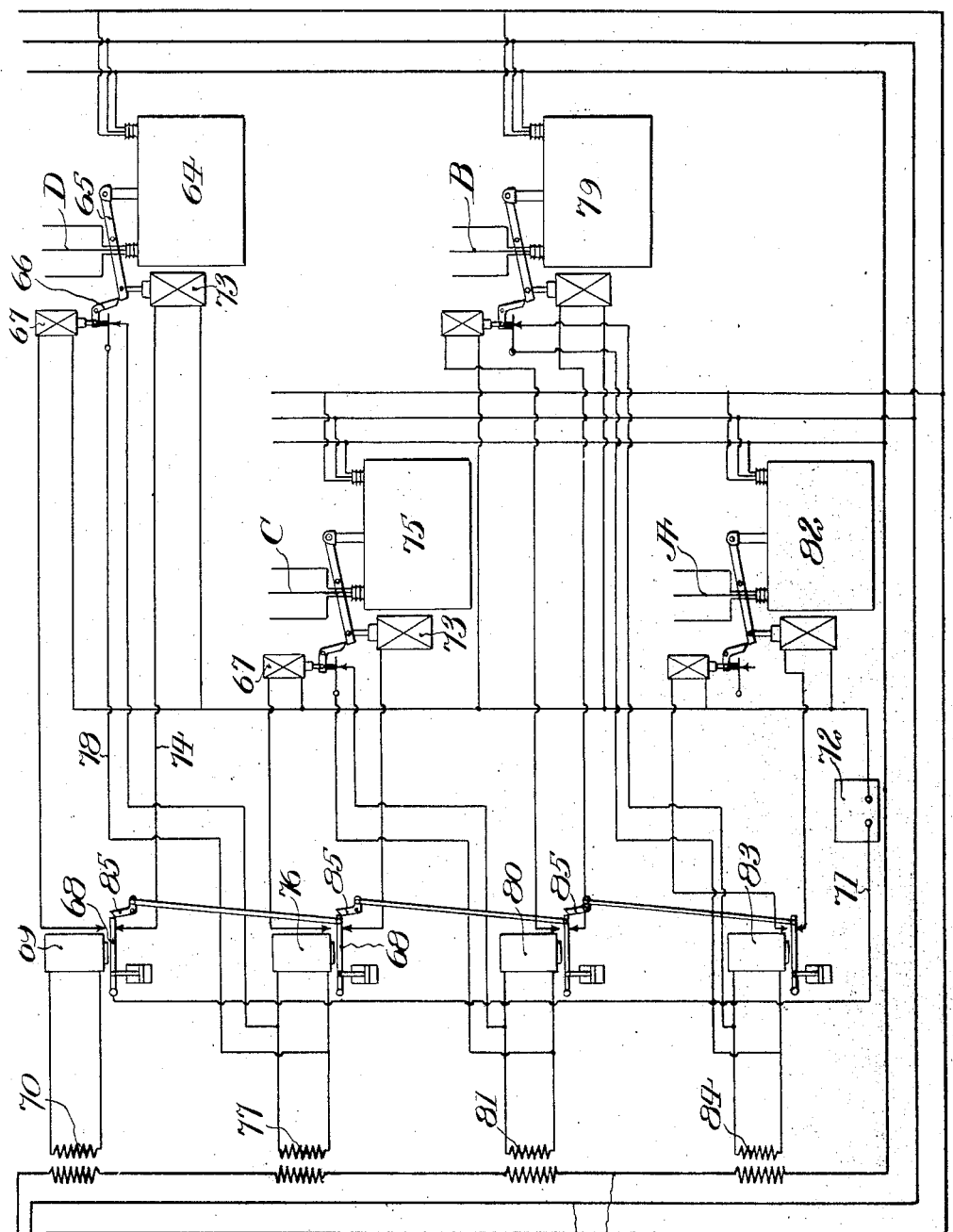

UNITED STATES PATENT OFFICE.

LUTHER STRAUGHAN HENLEY, OF LEBANON, AND FREDERICK ROWE KELLER, OF MANHEIM TOWNSHIP, LANCASTER COUNTY, PENNSYLVANIA.

SYMPATHETIC GOVERNOR FOR ELECTRIC-POWER DISTRIBUTION.

1,236,931.   Specification of Letters Patent.   Patented Aug. 14, 1917.

Application filed July 3, 1914. Serial No. 848,773.

*To all whom it may concern:*

Be it known that we, LUTHER STRAUGHAN HENLEY and FREDERICK R. KELLER, citizens of the United States, residing at Lebanon, in the county of Lebanon, State of Pennsylvania, and Manheim township, county of Lancaster, State of Pennsylvania, respectively, have invented certain new and useful Improvements in Sympathetic Governors for Electric-Power Distribution, of which the following is a description, reference being had to the accompanying drawing and to the figures of reference marked thereon.

Electric energy is often distributed from a main power line to a plurality of units where it is utilized for various purposes. These units may be so related to each other and to the capacity of the power plant as to approach very near to and sometimes exceed the capacity thereof. The present invention relates to new and useful improvements in sympathetic governors for distributing systems of the above character.

The object of the invention is to provide a sympathetic governor which is so constructed as to automatically cut out a portion or all of the power supplied to a unit of a minor or auxiliary character when the power required by all the units being operated by the system approaches the capacity of the generating unit so as to avoid the cutting out of a major or main unit and thereby maintain the continuous action or operation of said main unit.

A further object of the invention is to provide a governor of the above character which may be used in connection with a plurality of auxiliary or minor units and which is so constructed as to cut out said units in succession and in a predetermined order.

A still further object of the invention is to provide a sympathetic governor of the above character which is so constructed as to restore said units to their normal connection with the main power line when the power utilized by said major or main unit drops to a safe limit.

A still further object of the invention is to provide a sympathetic governor of the above character which will restore the minor or auxiliary units to operative connection with the main power line in the reverse order from which said units are cut out.

These and other objects will in part be obvious and will in part be hereinafter more fully disclosed.

In the drawings:

Figure 1 is a view showing more or less diagrammatically the sympathetic governor applied to a distributing system wherein the minor or auxiliary unit is utilized for operating an air compressor and wherein said sympathetic governor automatically unloads said compressor by successive stages and restores the compressor to normal full operative condition in the reverse order from which it is unloaded.

Fig. 2 is a view similar to Fig. 1 showing the sympathetic governor as applied to the plurality of auxiliary units wherein the several auxiliary units are successively cut out in a predetermined order and wherein said units are restored to normal operative connection with the line in the reverse order from which they are cut out.

Fig. 3 is a view similar to Fig. 1 showing a slightly modified form of sympathetic governor and also showing the governor as applied to a direct current distributing system.

The invention consists, generally, in providing a sympathetic governor which may be used in connection with a main power line which supplies a plurality of units. As shown in Fig. 1, the sympathetic governor is applied to the controlling of a system wherein an air compressor is operated from one of the units supplied by the power line, while another unit is utilized for operating a skip hoist, or the like. The skip hoist is operated only at intervals but it is extremely essential that when the hoist is in operation it shall continue or be maintained in operation until the desired cycle of operation is completed. It is also desirable to operate these units on a generating system wherein the combined load of all of the units approach very nearly or possibly exceeds the capacity of the generator for the power line. In conjunction with such a system, we have provided a sympathetic governor which is so constructed and operated as to unload the air compressor in stages as the power demanded by the combined units approaches the capacity of the generator and thus the operation of the hoist is maintained at a sacrifice for a temporary period of the operation of the air compressor. The air compressor has a plurality of devices for unloading the same in separate stages and each device is connected with a controller which is actuated by a relay in the main distributing line. There is a separate relay for each stage unloading device and the operating coil for each relay is provided with devices which cause the relays to become effective in a predetermined order both for unloading the compressor and for the restoring of the load thereto. Fig. 1 of the drawings shows in detail a specific embodiment of the invention above referred to.

In another embodiment of the invention, the sympathetic governor including relays and the automatic controlling device above referred to are utilized for cutting out in succession a plurality of auxiliary lines to which power is supplied from the main line and these auxiliary lines may be used for any desired purposes. Such an embodiment of the invention is shown in Fig. 2 of the drawings.

In the above referred to embodiments of the invention, the control for the cut out and restoring devices is partly mechanical and partly electrical. The relays are all short circuited except the one which is to be effective for cutting out one of the units or unloading the first stage of the air compressor and the operation of this first relay throws into operative connection the second relay, and so on. The armatures controlled by the relays are mechanically controlled by suitable latches so that the armatures can only be moved upon the releasing of the latches and these latches in turn are so controlled as to permit the relays to be rendered ineffective in reverse order from which they become effective. In another embodiment of the invention, the sympathetic controller is slightly modified in that the order of operation is mechanically controlled both in the cutting out of the auxiliary units and in the restoring of the same to normal operation. Such an embodiment of the invention is shown in Fig. 3 of the drawings.

Referring more in detail to the drawings, we have shown in Fig. 1 diagrammatically an embodiment of the invention wherein an air compressor is unloaded by separate stage unloaders so that said air compressor may be caused to run at full capacity; three-fourths its full capacity; one-half its capacity, etc. This embodiment of the invention is particularly adapted to be used where the air compressor is operated by the same power plant which operates the hoist or other devices connected with a mine. The air compressor and the other various units form a load on the power plant which when combined may run above the capacity of the power plant or generating system. The sympathetic governor is used for the purpose of automatically cutting out or modifying the action of the air compressor to prevent the load peak from running beyond the capacity of the power plant. In other words, if the hoist is operating, it will continue to operate and the power supplied to the air compressor will be cut down to permit this continued operation of the hoist. The air compressing cylinder of the air compressor is indicated at 1 in the drawings. The piston 2 is reciprocated in the cylinder by a motor M′ which is electrically operated from the main power line 3. The main power line 3 is herein shown as an alternating current-distributing system, and the power may be supplied to said power line 3 from any suitable source such as a generator S. The main power line is also utilized to operate the motor M which, in turn, oscillates the hoist S. This last-named unit will be referred to as the main unit of the system, while the air compressor will be referred to as the auxiliary unit of the system. These expressions are used solely for the convenience of describing the devices and for indicating that one unit is of greater importance than another when in operation and is, therefore, the desirable unit to maintain in action even at a sacrifice if necessary of the efficiency of the other units.

The cylinder 1 of the air compressor is provided with four unloaders 4, 5, 6 and 7. Each unloader consists of an auxiliary air chamber 8 which is connected to a port in the wall of the cylinder and each of these ports is controlled by a valve 9. The valve 9 is connected with a piston 10 in a piston chamber 11. These several piston chambers are connected, respectively, with the pipes 12, 13, 14 and 15. These pipes lead, respectively, to valve controlling chambers 16, 17, 18 and 19. These valve controlling chambers are alike in construction and each is supplied with a pipe 20 which is connected to a common valve chamber 21 and this valve chamber 21 is connected by a pipe 22 to the storage reservoir 23. When the pump is in normal operation the valves are set so that the storage reservoir will be connected through the pipes 12, 13, 14 and 15 with the piston chambers 11 and the valves 9 will be held closed. If any one of the pipes 12, 13, 14 or 15 are, however, cut off from the storage reservoir and opened to the atmosphere, this will release the pressure back of the pistons 10 and permit the valves to be opened. Each of the unloaders when its valve is opened reduces the rate of air delivered to the storage reservoir by approximately one-fourth, and the power demanded by the compressor by a corresponding amount. The valve chamber 21 is so constructed as to open the valve 9 of the first stage unloader, or as many of them as may be necessary to reduce sufficiently the rate of delivery of air to the storage reservoir so as to prevent overloading said reservoir. This valve chamber is provided with an exhaust pipe 24, a controlling piston 25, and a weighted lever 26 which is controlled by a diaphragm 27 connected with a chamber 28, which in turn is connected with the storage reservoir 23. This controlling mechanism for the stage unloaders forms no part of the present invention, except as used in conjunction with other controlling devices.

The present invention is directed to a sympathetic controller for operating the stage unloaders in succession and in a predetermined order. This is accomplished through the valve chambers 16, 17, 18 and 19 and the controlling devices therein. The valve chamber 21 serves as a means for connecting all of the valve chambers 16, 17, 18 and 19 with the storage reservoir 23. The storage reservoir 23 is connected through the usual pipe 29 with the cylinder 1. Each of the valve chambers 16, 17, 18 and 19 is similar in construction and a description of one will answer for the others. Said valve chamber is provided with a piston valve 30 which is connected to a core 31 of a coil 32. Each valve chamber has an exhaust outlet 33. The piston valve 30 is so constructed that when in its lower position the pipes leading from the stage unloaders are connected with the pipes 20 so that each piston 10 is subjected to the air pressure in the storage reservoir. When, however, the valve piston 30 is raised then the pipes leading to the stage unloaders are connected through the exhaust pipes 30 with the atmosphere.

Our sympathetic controller is so constructed as to operate in succession and in a predetermined order these piston valves 30 so as to render effective first one stage unloader and then another and so on, and the sympathetic controller is also so constructed as to restore these stage unloaders to normal ineffective condition in the reverse order from which they are rendered effective.

This sympathetic controller or governor comprises a plurality of transformers 34, 35, 36 and 37*. These transformers are connected respectively with relays 37, 38, 39 and 40. The controlling coil for the valve 16 is in circuit with a suitable source of energy supplied through the lines 41 controlled by a switch 42. One terminal of the coil is connected with a wire 43, while the other terminal is connected with the wire 44. The armature 45 of the relay 37 makes or breaks the contact of this circuit for the coil controlling the valve 16. When the relay 37 is energized and armature 45 lifted, said armature makes contact at 46, thus establishing the circuit. A dash pot 47 is connected with the armature 45 to control the movements thereof. Each of the relays 37, 38, 39 and 40 is adjusted to close its respective contacts at the same value of current in the main power line 3. When the relay 37 closes the circuit is established through the coil controlling the valve 16 which raises the valve and this opens the pipe 12 to the atmosphere which allows the valve 9 to rise and thus renders effective the first stage unloader. The relay 38 is short-circuited when the valve 16 is in position for rendering the first stage unloader inoperative or ineffective and likewise the relays 39 and 40 are short-circuited, so that under normal conditions when the air compressor is working under full load the relay 37 is the only one which has operative connection with its transformer. This short circuiting of the relays 38 and 39 and 40 is accomplished by independent circuits 48, 49, and 50, respectively. The circuit 48 is established by a switch 51 which is controlled by the valve piston 30 of the valve chamber 16. When this valve piston is down the circuit is closed and the coil 38 is cut out. Likewise, a switch 51 controls the circuit 49 and this switch is operated by the valve piston of the valve 17. A switch 51 likewise controls the circuit 50 and this switch is operated by the valve piston of the valve 18.

From the above description, it will be apparent that when the power demanded from the main power line 3 approaches the capacity of the power plant, the transformer 34 will energize the relay 37 which will in turn close the circuit of the coil 32 and this coil will be energized through the current supplied through the lines 41 and the coil will lift the core 31, thus shifting the valve 30 and rendering effective the first stage unloader. At the same time the valve 30 is raised, the switch 51 is lifted breaking the short circuit of the relay 38 and this relay 38 will be energized by the transformer 35, provided the demand on the power line is still sufficient to actuate the same. When the first stage unloader is rendered effective, the power demanded by the unit operating the air compressor is less and this will reduce the load on the power plant by a certain definite amount. When the power demand of the hoist drops, then the armature 45 of the relay 37 will be released breaking the circuit of the coil 32, allowing the core 31 to drop, reëstablishing the connection of the pipe 12 and storage reservoir 23, and this in turn will close the valve 9, rendering ineffective the first stage unloader. If the power load continues to rise, the relay 38 will be energized and will in turn lift the armature 45 thereof, establishing a circuit through the line 52 which connects the coil 53 in circuit with the circuit supplied through the lines 41. The coil 53 will lift the core and actuate the piston valve 54 of the valve chamber 17 and this will in turn open the valve chamber 11 of the second stage unloader 5 to the atmosphere, rendering said stage unloader effective. This stage unloader when it becomes effective will reduce further the power required to operate the air compressor. When the piston valve 54 is raised, the switch 51 of the short circuit 49 is opened and this in turn connects the relay 39 with the transformer 36, and the relay 39 now becomes operative to actuate the armature 45 thereof when the load increases further on the power line and the movement of the armature 45 establishes the circuit 56 of the coil 57 for the valve chamber 18. A movement of the valve in the valve chamber 18 opens the circuit 50 of the relay 40 and renders the same effective to control in a like manner the coil 58 through the line 59.

It will thus be seen that the stage unloaders are operated not only in succession but in predetermined order by reason of the fact that all of the relays except one are short circuited and these relays are thrown into effective connection with their respective transformers one after the other as the preceding relay is actuated to control one of the stage unloaders.

It is also desirable that these stage unloaders shall be rendered ineffective in succession so that the entire load will not be at once thrown on to the line. This is accomplished by a mechanical locking device which as herein shown consists of a series of latches 60, 61 and 62. The latch 62 is pivoted and connected by a link 63 with the armature 45 of the relay 40. The latch 61 is connected by a similar link 63 with the armature of the relay 39 while the latch 60 is connected by a similar link 63 with the armature of the relay 38. When the armature 45 of the relay 38 is raised, the latch 60 is swung underneath the armature 45 of the relay 37. Let us suppose that the demand on the power line renders effective the first two stage unloaders; that is, the relays 37 and 38 are effective to close the circuits for the coils 32 and 53 respectively. The upward movement of the armature 45 of the relay 38 throws the latch 60 underneath the armature 45 of the relay 37. As long as the armature of the relay 37 is held raised, the circuit through the coil 32 is established. If the power demand decreases so as to release both relays 37 and 38 the armature of the relay 38 will drop first for the reason that the armature of the relay 37 is held raised by this latch and it is only the downward movement of the armature of the relay 38 which shifts the latch 60 to permit the armature of the relay 37 to drop. Therefore, the second stage unloader will be rendered ineffective prior to the rendering of the first stage unloader ineffective which is the reverse order in which these relays were operated to unload the air compressor. It will be obvious that the mechanical controlling devices for the other relays will operate in a similar manner and that the four stage unloaders herein shown will, through the action of the sympathetic controller or governor be rendered effective in succession and in a certain predetermined order, and will also be rendered ineffective in succession and in the reverse order.

From the above construction, it will be apparent that we have provided a sympathetic governor which operates automatically to cut out a certain portion of the power demanded in an auxiliary unit in order to maintain a proper supply of power for a main or major unit and this sympathetic governor or controller will also automatically restore the auxiliary unit to full normal capacity as soon as the power demanded from the main power line drops to a safe limit.

While we have described the sympathetic governor as applied to a stage unloader of an air compressor, it will be obvious that the same may be similarly applied to a hydraulic pump, whereby by-passes are substituted for the unloaders above described.

In Fig. 2 of the drawings, we have shown our sympathetic governor as applied to the controlling of units supplied by lines leading from the main power line which is supplied with power from a suitable source such as the generator S, and these units are of relatively different importance. In this figure the main power line is indicated at 3 and tapped into the main power line are four distributing lines A, B, C and D. Let us suppose that it is of relatively greater importance to maintain the line A than the lines B, C or D, and also of greater importance to maintain the line B than the line C and D. Say for example the line A is used to energize a main car line, while line B is used to energize a suburban line of lesser importance, etc. Apply our sympathetic governor to this power distributing system and said governor will operate to cut out the power supplied to line D, provided the power demanded by all the units exceeds the capacity of the power plant. If the demand increases so that the power required for the units A, B and C exceeds the capacity of the plant, then the line C will be automatically cut out and if the power demanded still increases, then the line B will also be cut out. This sympathetic governor or controller will also insure that the lines be restored to normal operative connection with the main power line in the reverse order from which they are cut out. The sympathetic governor as applied to these units is similar in construction to that described above in detail and a detail description of all the parts will not be necessary. The line D is connected with the main power line 3 through the usual switch 64. The controlling lever 65 is normally thrown to open the switch by the usual spring or by gravity and said switch is held closed by a latch 66. This latch is operated by a coil 67 which is controlled by the armature 68 of the relay 69 which is energized by the transformer 70. When the load on the main power line increases so as to energize the relay 69 through the transformer 70 and lift the armature 68, the circuit through the coil 67 is established which shifts the latch 66 to release the circuit breaker and permit the same to open to cut out the line D. The coil 67 is energized by a circuit 71 connected to the terminals 72 of a suitable source of supply. The lever 65 of the switch 64 is connected to the core of a coil 73. The coil 73 is connected through the circuit 74 with the source of current 72. The circuit 74 is also controlled by the armature 68. If the load on the main power line decreases to a safe limit, then the relay 69 will release the armature 68 which drops, breaking the circuit of the coil 67 and establishing the circuit of the coil 73. This releases the latch 66 and also operates the lever 65 to close the switch and establish the connection of the circuit D with the main power line. The circuit C is controlled by a circuit breaker 75 which has a coil 67 for controlling the latch and a coil 73 for closing the switch. These coils 67 and 73 are controlled by a relay 76 which in turn is energized by a transformer 77. The relay 76 is normally short circuited by the line 78. This line 78 is controlled by the coil 67 of the circuit breaker 64. When the coil 67 is energized to swing the latch 66 to open the circuit breaker, the short circuit is broken, which renders the relay 76 effective to control the circuit breaker 75. This relay 76 operates an armature 68 which controls the coils for the circuit breaker 75 in the same manner as above described in connection with the circuit breaker 64. There is also a circuit breaker 79 for the circuit B which is controlled by a relay 80 energized by a transformer 81 and there is a circuit breaker 82 for the circuit A controlled by a relay 83 energized by a transformer 84. There is likewise a locking latch 85 for the armature of each relay and these latches operate in precisely the manner above described in connection with Fig. 1 for causing the circuit breakers to be thrown to close the circuits in succession and in reverse order from which the circuit breakers are opened.

From the above construction, it will be apparent that when the load on the line rises above the capacity of the power plant, the transformer 70 through the relay 69 will open the circuit breaker of the line D and this simultaneously renders effective the relay 76 for controlling the line C. A movement of the armature of the relay 76 not only releases the circuit breaker 75 but renders effective the relay 80 and the actuation of the armature of the relay 80 not only opens the circuit breaker 79 but renders effective the relay 83. Through the mechanically operated latches 85 the armatures of the relays will be allowed to drop in reverse order from which they are actuated and in succession so that the line A will first be restored, then B, then C, and finally D.

In Fig. 3 of the drawing, we have shown a slightly modified form of sympathetic governor or controller and we have also shown the same applied to a direct current power distributing system. In this figure the main power line is indicated at 86. Tapped into this main line are four distributing circuits A', B', C' and D'. These circuits bear the same relation to each other as the circuits A, B, C and D described in connection with Fig. 1. The circuit D' is provided with a circuit breaker 87 which is actuated by a spring 88 and controlled by a latch 89. This latch is controlled by a coil 90 in a circuit 91, which in turn is connected by an armature 92 of a relay 93 in shunt with the main line 86. When the relay 93 is actuated, the armature 92 is raised and establishes the circuit 91 which causes the coil 90 to release the latch 89 and this permits the circuit breaker to open. In like manner, the circuit breaker 94 of the circuit C' is controlled by a relay 95 having an armature 96. The circuit B' is controlled by a circuit breaker 97 which in turn is controlled by a relay 98 having an armature 99. The circuit breaker 100 of the circuit A' is controlled by a relay 101 having an armature 102. Instead of short circuiting the relays, we have provided a mechanical means for causing the relays to operate one after the other in a predetermined order to raise the armatures. A latch 104 is adapted to engage the armature 96 and hold the same away from the coil 95. When this latch engages the armature, the coil 95 may be energized but the armature will not be lifted. The latch is connected by a link 105 with the armature 92 of the relay 93. A similar latch 104 is connected by a link 105 with the relay armature 96 and controls the armature 99 of the relay 98. Likewise, a similar latch 104 and link 105 controls the armature 102 through the movement of the armature 99. From the above it will be noted that the armatures 96, 99 and 102 are all locked in lowered position. When the armature 92 is raised, then 96 is released, and when 96 is raised, 99 is released, and when 99 is raised, 102 is released. This insures the armatures being actuated in succession and in the predetermined order stated. The latches 103 operate in precisely the manner described in connection with Figs. 1 and 2 and cause the armatures to be released and dropped in the reverse order.

In connection with the first application of the invention where an air compressor is unloaded by separate and independently operating stage unloaders, each stage unloader is, in effect, the equivalent of an auxiliary unit demanding a certain amount of power, and each of these unloaders will be referred to in the claims as the auxiliary units which are cut out in a certain predetermined order and restored in the reverse order.

From the above description, it will be apparent that we have provided a sympathetic governor or controller having a plurality of units which are operated from the same power plant and this sympathetic controller will cut out a portion of the power supplied to minor or auxiliary units automatically when the load increases upon the power plant to a point near the capacity of the plant or exceeding the same, and this prevents the cutting out of a main line so that the same may be continuously in action, notwithstanding the varying load placed on the power plant.

It is obvious that minor changes in the details of construction and the arrangement of parts may be made without departing from the spirit of the invention as set forth in the appended claims.

Having thus described our invention, what we claim as new and desire to secure by Letters Patent is:—

1. The combination with a power supply, operating a main unit and a plurality of auxiliary units, of a sympathetic governor including a relay for controlling the power supplied to each auxiliary unit, and devices coöperating with said relays whereby said relays become effective one after the other in a predetermined order for cutting out the power supplied to the auxiliary units, and whereby said relays become ineffective to cut out the power supplied to the auxiliary units in the reverse order from that in which they are rendered effective.

2. The combination with a power supply operating a main unit and a plurality of auxiliary units, of a sympathetic governor including a relay for controlling the power supplied to each auxiliary unit, a controlling coil for cutting out each unit, devices for short circuiting the relays of all of the units except one whereby said relays will operate to render effective one coil only when the power demanded by the combined units approaches or exceeds the capacity of the power supply, and devices whereby when said coil is rendered effective a short circuit of another relay is broken and a second coil rendered effective to the control of the relay therefor.

3. The combination with a power supply operating a main unit, and a plurality of auxiliary units, of a sympathetic governor including a relay for controlling the power supplied to each auxiliary unit, a controlling coil for cutting out each unit, devices for short circuiting the relays of all of the units except one whereby said relays will operate to render effective one coil only when the power demanded by the combined units approaches or exceeds the capacity of the power supply, devices whereby when said coil is rendered effective a short circuit of another relay is broken and a second coil rendered effective to the control of the relay therefor, and means for locking the armature of the first relay until the armature of the second relay is released whereby said auxiliary units will be rendered effective in the reverse order from which they are rendered ineffective.

4. The combination with a power supply operating a main unit and a plurality of auxiliary units, including a relay controlled by the power supply for each unit, a controlling coil for each relay, devices operated by the controlling coil for cutting out the auxiliary units, devices whereby the relays become effective one after the other in a predetermined order, and devices whereby said relays become ineffective to control the coils in the reverse order from that in which they are rendered effective.

5. The combination with a power supply operating a main unit and an air compressor, of a sympathetic governor including devices whereby said air compressor may be unloaded by separate stages when the power demanded by said main unit and air compressor approaches or exceeds the capacity of the power supply.

6. The combination with a power supply operating a main unit and an air compressor, of a sympathetic governor including devices whereby said air compressor may be unloaded by separate stages when the power demanded by said main unit and air compressor approaches or exceeds the capacity of the power supply, and whereby said air compressor is restored to its full normal action when the power utilized by the main unit drops to a safe limit.

7. The combination with a power supply operating a main unit and an air compressor having separate stage unloaders, of a sympathetic governor including controlling coils for each stage unloader, a circuit for each coil, a relay for controlling the circuit of each coil, a transformer for each relay, devices for short circuiting all of the relays except one, and means whereby the short circuit of a second relay is opened when the first coil is energized whereby said second relay becomes effective to control the second coil, and means controlled by the armature of the second relay for holding the armature of the first relay raised until said second relay armature drops whereby the stage unloaders of the air compressor are rendered ineffective in succession.

8. The combination with a power supply operating a main unit and an air compressor having a plurality of stage unloaders, a controlling coil for each stage unloader, a circuit for each controlling coil, a relay for each coil for controlling its circuit, a transformer for controlling each relay, means whereby all of said relays except one are rendered ineffective, and whereby said relays are rendered successively effective, and means whereby said relays are rendered successively ineffective in the reverse order from that in which they are rendered effective to close the circuits of their respective coils.

In testimony whereof, we affix our signatures, in the presence of two witnesses.

LUTHER STRAUGHAN HENLEY.
FREDERICK ROWE KELLER.

Mr. Henley's witnesses:
  H. C. ALLEN,
  BERTHA HENLEY.
Mr. Keller's witnesses:
  B. F. DAVIS,
  WM. J. COULTER.